(12) United States Patent
O'Sullivan (10) Patent No.: US 9,839,570 B2
(45) Date of Patent: Dec. 12, 2017

(54) MOTORIZED WALKING AND BALANCING APPARATUS

(71) Applicant: Eugene O'Sullivan, Wayne, NJ (US)

(72) Inventor: Eugene O'Sullivan, Wayne, NJ (US)

( * ) Notice: Subject to any disclaimer, the term of this patent is extended or adjusted under 35 U.S.C. 154(b) by 0 days.

(21) Appl. No.: 14/801,755

(22) Filed: Jul. 16, 2015

(65) Prior Publication Data
US 2017/0014298 A1    Jan. 19, 2017

(51) Int. Cl.
| *A61H 3/04* | (2006.01) |
| *A61H 3/00* | (2006.01) |
| *B60K 7/00* | (2006.01) |
| *F16B 7/10* | (2006.01) |

(52) U.S. Cl.
CPC ......... *A61H 3/04* (2013.01); *A61H 2003/001* (2013.01); *A61H 2003/043* (2013.01); *A61H 2201/0161* (2013.01); *A61H 2201/0188* (2013.01); *A61H 2201/0192* (2013.01); *A61H 2201/5007* (2013.01); *B60K 7/0007* (2013.01); *F16B 7/105* (2013.01)

(58) Field of Classification Search
CPC . A61G 5/046; A61H 2003/043; B60K 7/0007
See application file for complete search history.

(56) References Cited

U.S. PATENT DOCUMENTS

| 5,224,562 | A   | * | 7/1993 | Reed    | A61H 3/04 |
|           |     |   |        |         | 180/19.1 |
| 6,378,883 | B1  | * | 4/2002 | Epstein | A61G 5/04 |
|           |     |   |        |         | 180/6.5  |
| 7,426,970 | B2  | * | 9/2008 | Olsen   | A61G 5/046 |
|           |     |   |        |         | 180/65.1 |
| 7,938,756 | B2  | * | 5/2011 | Rodetsky | A61H 3/04 |
|           |     |   |        |         | 135/67 |
| 9,314,387 | B2  | * | 4/2016 | AlGhazi | A61H 3/04 |
| 2005/0236217 | A1 | * | 10/2005 | Koelin | A61G 5/046 |
|           |     |   |        |         | 180/411 |
| 2015/0209204 | A1 | * | 7/2015 | Hsu   | B62D 51/04 |
|           |     |   |        |         | 180/19.1 |

\* cited by examiner

*Primary Examiner* — Kevin Hurley
(74) *Attorney, Agent, or Firm* — Inventa Capital PLC (57) ABSTRACT

A motorized walker of the present invention is includes a first section and a second section including a pair of front legs and rear legs and handle members. Each rear leg and front leg include respective extension elements telescopingly engaged with the terminal ends of the respective rear legs and the front legs to allow a user to adjust the height of the walker. Each section includes a front wheel and a motor. Each section and the rear leg present a wheel of different construction.

8 Claims, 7 Drawing Sheets

MOTORIZED WALKING AND BALANCING APPARATUS

FIELD OF THE INVENTION

The present invention is concerned with walking aids for the infirm or disabled.

BACKGROUND OF THE INVENTION

Walkers are used by people with walking difficulties to support them while walking. These devices are normally constructed as four-legged, open-bottomed, self-standing structures that a person can approach and stand within for at least partial support while holding on during the taking of walking steps. Examples of typical walker devices of this kind are shown in U.S. Pat. No. 2,708,473 to Gable and U.S. Pat. No. 3,354,893 to Schmerl. The persons using the device picks it up, places it on the ground a distance of several steps in front of him/her, and then walks to it while holding on for support, whereupon the process is repeated. The walkers need to be manipulable by a user, and thus need to be relatively light, and, consequently, tend not to be motorized. Manual and motorized wheelchairs are generally designed for the more extremely disabled user thus are not a comparative solution for the specific societal needs.

Alluding to the above, U.S. Pat. No. 5,168,947 to Rodenborn teaches a motorized walker including a base upon which a person can stand, with wheels on the base for rollably supporting the base. A walker frame within which a person can stand is detachably mounted on the base (a safety risk), and includes control switches for separately and independently actuating the electric motors such that the person can stand on the motorized walker and maneuver it in any desired direction. The device taught by the U.S. Pat. No. 5,168,947 to Rodenbom provides a moving platform facilitator versus a walking aid. Here, patient's legs do not touch the ground and when the frame is removed it is simply a standard walker. This prior art reference provides more akin to a stand-up wheelchair rather than a walker and the support frame (walker frame) is no different in function to that of the hand bars of a wheelchair when installed on the platform. The device taught by the U.S. Pat. No. 5,168,947 to Rodenbom is heavy, not easily foldable and in general quite user unfriendly.

Another prior art reference, such as U.S. Pat. No. 4,280,578 to Perkins. It teaches a walker device for aiding invalids and other persons having walking difficulties has an upstanding open-bottomed framework toward and within which a person can take steps while holding on and being supported by the framework. The framework is provided with wheels and is motorized, with controls conveniently located for activation by the person using the device. The device taught by the U.S. Pat. No. 4,280,578 to Perkins is a different challenge. The practicality of two drill motors with a pull cord to activate the drills is not realistically feasible. However, two motors, control switch and power source of electric drills strap mounted with a rubber pressure strap to hold the worm gear indirectly to the wheel gear cannot work for an extended period of time as designed.

Still another prior art reference, such as U.S. Pat. No. 5,224,562 to Reed, teaches a walking aid has a supporting framework mounted on two independently driven wheels, driven by respective electric motors. The motors are operable by respective switches provided on the framework, such that each wheel can be independently rotatably driven in a clockwise or anticlockwise direction. The device taught by the U.S. Pat. No. 5,224,562 to Reed is also an interesting challenge. Conceptually, it is a battery driven direct motor to wheel arrangement but also inhibits the forward stepping movement of the user. It does not have swivel rear wheels.

The U.S. Pat. No. 4,280,578 Perkins teaches individual controls and the U.S. Pat. No. 5,224,562 to Reed teaches explicitly use of reversing the motors to execute turns. On the other hand, neither the U.S. Pat. No. 4,280,578 Perkins or the U.S. Pat. No. 5,224,562 to Reed talk about variable speed operation and fail to tech running both motors concurrently in the same direction and at different speeds, which would facilitate gentle turns and "crabbing" the walker alongside of a hill.

To the extent effective, the aforementioned prior art devices taught by the U.S. Pat. No. 4,280,578 to Perkins, U.S. Pat. No. 5,168,947 to Rodenbom, and U.S. Pat. No. 5,224,562 to Reed are complicated to use, bulky, and expensive to manufacture and service. Thus, an opportunity exists for unique and new motorized walker.

This invention, together with the additional features and advantages thereof, which is only summarized in the foregoing passages, will become more apparent to those of skill in the art upon reading the description of the preferred embodiments, which follows in the specification taken together with the drawings.

SUMMARY OF THE INVENTION

A motorized walking and balancing apparatus (the walker) of the present invention is formed of metal tubing appropriately cut and bent. The walker includes a first section and a second section. Each section present a generally U shaped form but other configurations may be used without limiting the scope of the present invention. Each section includes a pair of front and rear legs, respectively, and handle members.

Each rear leg and front leg include respective extension elements telescopingly engaged with the terminal ends of the respective rear legs and the front legs to allow a user to adjust the height of the walker. Each element includes a plurality of openings to receive a pin extending from the legs to mechanically secure the elements with the legs. Each section includes a front wheel, a motor, with the motor and a wheel operably connected to the respective section and sharing an axis. Each section and the rear leg present a wheel of different construction.

The rear wheel is sandwiched, forked, straddled, and/or positioned between a bracket pivotably movable about a pivoting axis as the walker turns at different directions. The sections are interconnected by a middle section, presenting side tubes, with the front legs extending therethrough, and rigidly interconnected by a top reinforcement bar having a light, and a bottom reinforcement bar. Each section includes a side reinforcement element pivotably connected to the top reinforcement bar by a fold release mechanism, as known to those skilled in mechanical art. These mechanisms allow the user to fold the walker in order to store and/or transport it.

Alluding to the above, each section further includes a semi-tubular reinforcement section interconnecting the front leg and the rear leg. The semi-tubular reinforcement section present a generally U-shaped form. The section further includes a bottom reinforcement bar interconnecting the rear leg and the front leg in order to provide additional reinforcement to the entire structure.

The section further includes a housing, which is releasable connected to the front leg and the rear leg by C-clips to provide additional reinforcement to the entire structure and to store a controller and batteries. When the controller needs to be services or the batteries need to be replaced, the C-clips will be removed in order to release the housing from rigid engagement with the front leg and the rear leg.

An advantage of the present invention is to provide an improved walking device that will address the posture issues noted in the formal Physical Therapy guidelines, namely, that a typical patient undesirably violates the critical criteria of desired posture since the patient has to bend over, adding weight to the spine, when moving the strut walker or even pushing the wheeled version.

Another advantage of the present invention is to provide an improved walking device that will similarly address the pride and self esteem issue as the user may now join a conversation circle from an upright, direct eye to eye contact position versus bending over to position the traditional walker into and within the circle and then stand upright to join the conversation.

Still another advantage of the present invention is to provide a walker, which has a direct benefit in Physical Therapy by reassigning some the weight from the patients legs to his/her arms during the period of moving. The traditional walker requires the user to transfer all his/her weight to his/her legs and bend in a forward position to navigate the next stepping position. The present invention negates these shortcomings as it consistently supports the user during movement. It also encourages the desired therapeutic posture sought at the rehabilitation centers. In essence, as the walker of the present invention is used, it simulates the experience of the parallel bars in a therapy center as is applicable to children with birth defects, military accidents/war injuries, car accident and sports accident injuries, etc. Suffice it to say, the walker of the present invention spans the scope of age, thereby encouraging extended walking exercises with managed weight on the legs, hence, building muscle tone and thus, expediting the healing process.

Still another advantage of the present invention is to provide a walker, which will redefine the whole expectation of ambulatory assistance, elongating the gap between the walking cane and the wheelchair.

Still another advantage of the present invention is to provide a walker, which enhances mobility for extended walks including shopping whereby allowing the user to add a shopping bag of groceries or other such items in the walker carrying basket and then be able to move them with no physical effort other than simply pressing a throttle.

Still another advantage of the present invention is to provide a walker that will allow users to take their grandchildren to the park with the ability to maneuver in the grass with similar ease as on the pathway;

Still another advantage of the present invention is to provide a walker enabling an MS or similar physically limited, patient to assist on the farm with light chores including navigation of rough terrain while carrying a feed bucket, collecting eggs, closing a gate, etc.

Other advantages and meritorious features of this invention will be more fully understood from the following description of the preferred embodiment, the appended claims, and the drawings; a brief description of which follows.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Referring to the Figure, wherein like numerals indicate like or corresponding parts throughout the several views, a motorized walking and balancing apparatus (the walker) of the present invention is generally shown at 10 in FIGS. 1, 5, 6, and 8. In the form illustrated, the walker 10 is formed of metal tubing appropriately cut and bent. Those skilled in the art will appreciate that materials other than metal can be used without limiting the scope of the present invention. The walker 10 includes a first section, generally shown at 12 and a second section, generally shown at 14. Each section 12 and 14 present a generally U shaped form but other configurations may be used without limiting the scope of the present invention. Each section 12 and 14 include a pair of front and rear legs, generally indicated at 16 and 18, respectively, and handle members 20 and 22.

Figure 1:
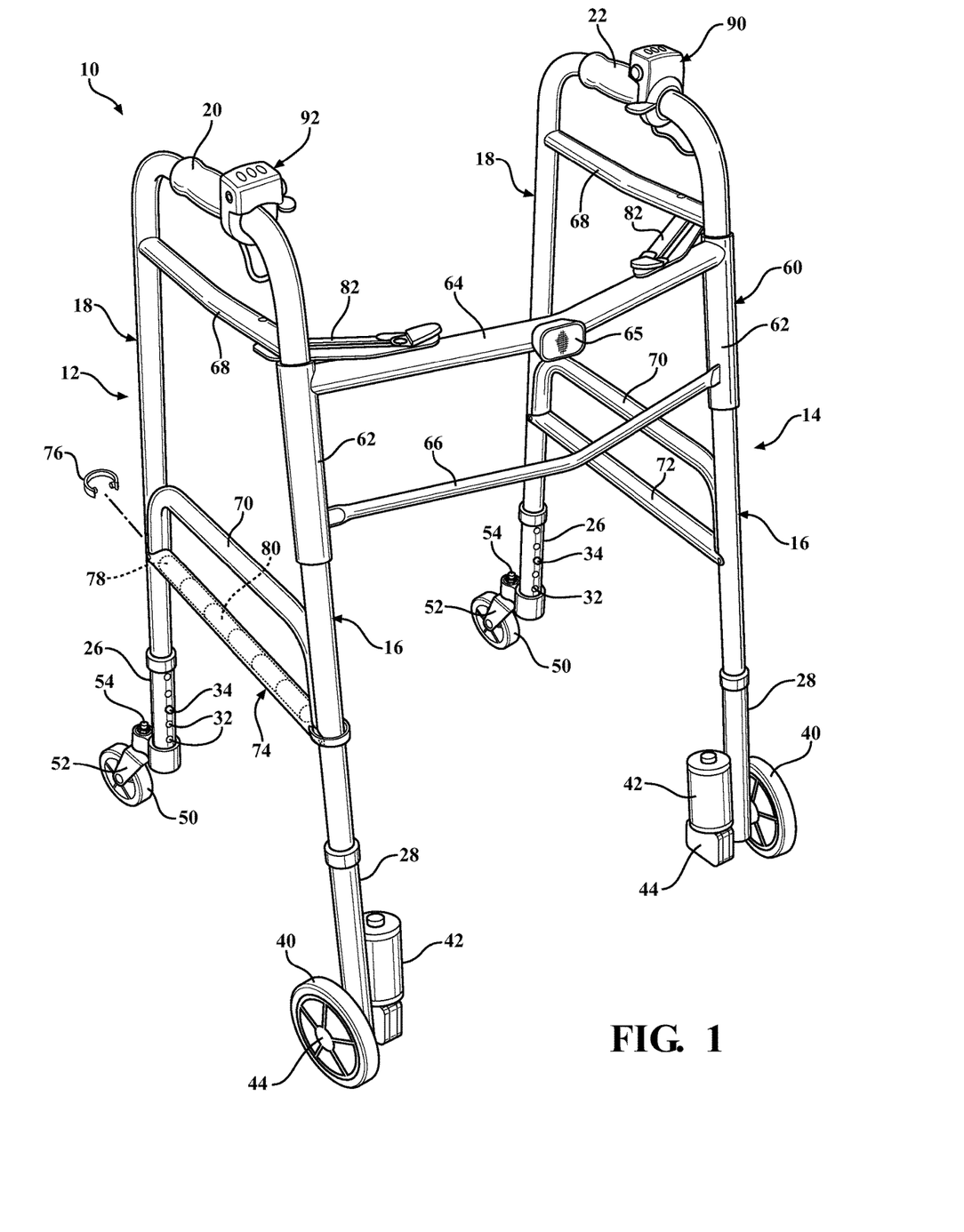
FIG. 1 illustrates a perspective view of a motorized walking and balancing apparatus of the present invention and also displays the power-pack assembly used to provide power and the associated controller mother board.

Each rear leg 18 and front leg 16 include respective extension elements 26 and 28 telescopingly engaged with the terminal ends of the respective rear legs 18 and the front legs 16 to allow a user 30 to adjust the height of the walker 10. Each element 26 and 28 includes a plurality of openings 32 to receive a pin 34 extending from the legs 16 and 18 to mechanically secure the elements 26 and 28 with the legs 16 and 18.

As best shown in FIGS. 1, 4, 5, and 6, each section 28 includes a front wheel 40, a motor 42, with the motor 42 and a wheel 40 operably connected to the respective section 28 and sharing an axis 44. Each section 26 and the rear leg 18 present a wheel of different construction. The rear wheel 50 is sandwiched between a bracket 52 pivotably movable about a pivoting axis 54 as the walker 10 turns at different directions. The sections 12 and 14 are interconnected by a middle section, generally indicated at 60, presenting side tubes 62, with the front legs 16 extending therethrough, and rigidly interconnected by a top reinforcement bar 64 having a light device 65, and a bottom reinforcement bar 66. The light device 65 is provided for street and rural/farming environments. The power to the light device 65 may be supplied by an independent source or from the onboard power pack. Each section 12 and 14 includes a side reinforcement element 68 pivotably connected to the top reinforcement bar 64 by a fold release mechanism 82, as known to those skilled in mechanical art. These mechanisms 82 allow the user 30 to fold the walker 10 in order to store and or transport it.

In reference to the above, each section 12 and 14 further includes a semi-tubular reinforcement section 70 interconnecting the front leg 16 and the rear leg 18. The semi-tubular reinforcement section 70 present a generally U shaped form. Other configurations of the semi-tubular reinforcement section 70 may be used without limiting the scope of the present invention. The section 14 further includes a bottom reinforcement bar 72, 74 interconnecting the rear leg 18 and the front leg 16 to store the power pack—a controller 78 and batteries 80. It also provides additional reinforcement to the entire structure. When the controller 78 needs to be services or the batteries 80 need to be replaced, the C-clips 76 will be removed in order to release the power pack housing 72, 74 from rigid engagement with the front leg 16 and the rear leg 18.

Figure 2:
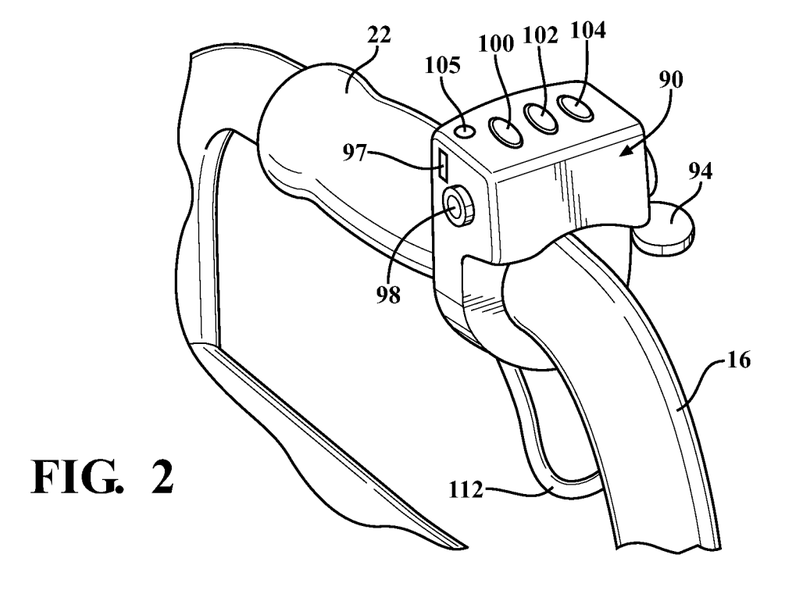
FIG. 2 illustrates a perspective fragmental view of a right side handle with a first activator device located thereon.
Figure 3:
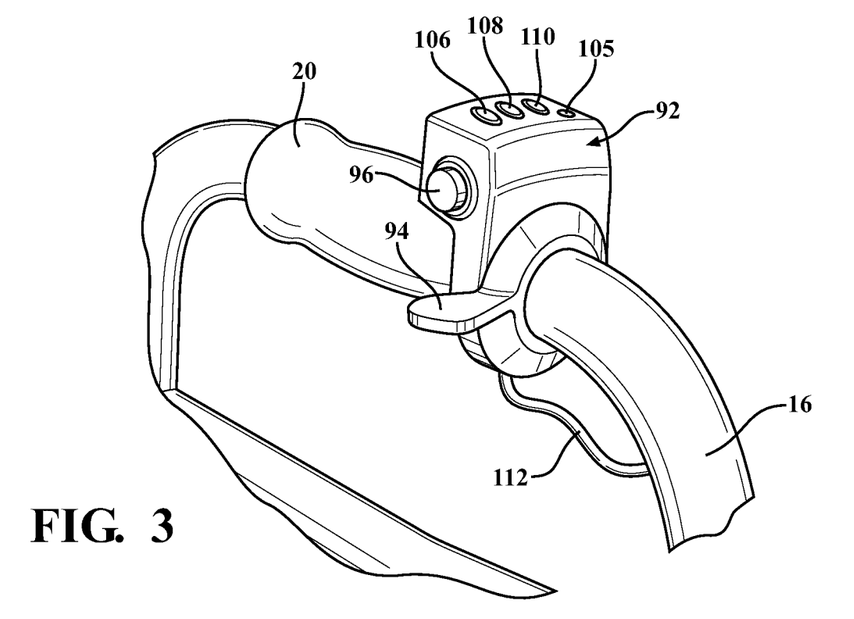
FIG. 3 illustrates a perspective fragmental view of a left side handle with a second activator device located thereon.
Figure 4:
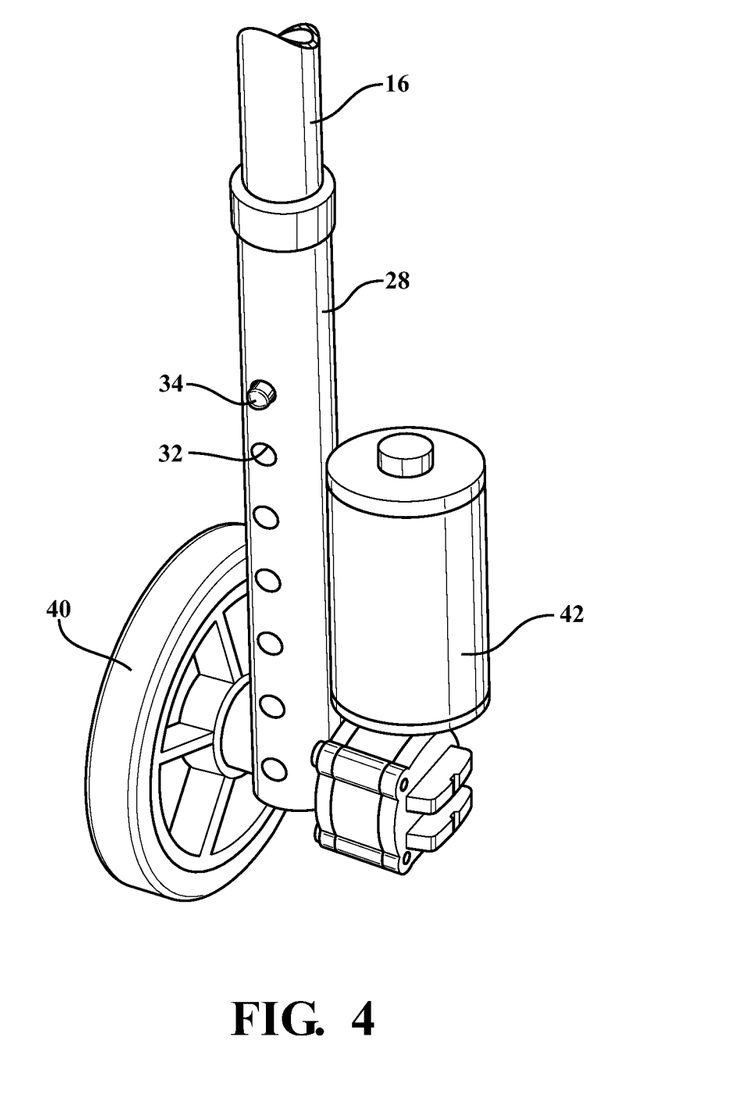
FIG. 4 illustrates a perspective fragmental view of one of the legs of the apparatus having a wheel and a motor cooperable with the wheel and connected to a distal section of the leg adaptable to extend from a main section of the apparatus at various distances based on need and height of the user.
Figure 5:
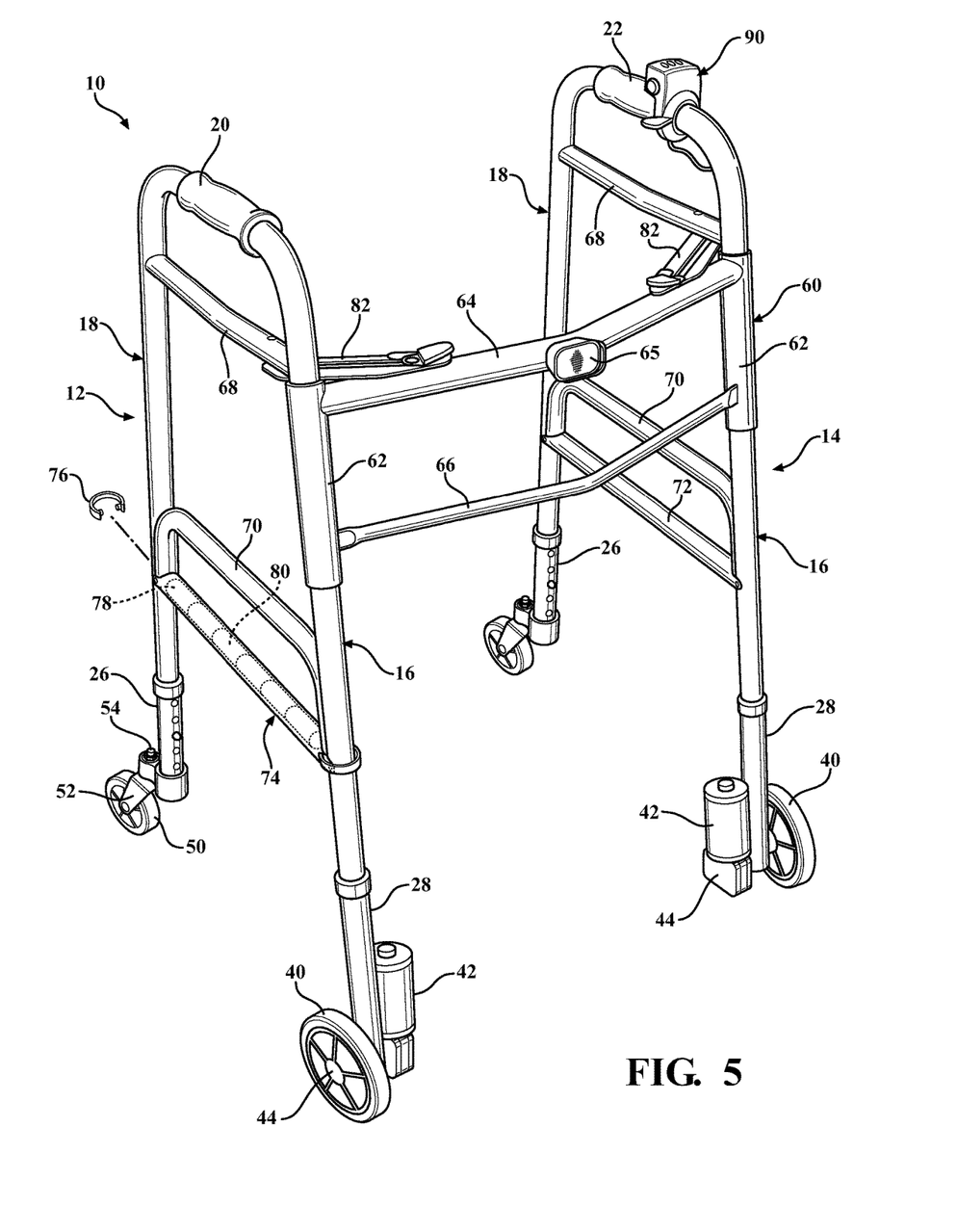
FIG. 5 illustrates a perspective view of an alternative embodiment of the motorized walking and balancing apparatus of the present invention as shown on FIG. 1 with a single activator device.

The motorized walker 10 is controlled by a throttle assembly, generally indicated at 90 and 92 in FIGS. 2 and 3 to direct the user 30 in a desired direction and speed. Each throttle assembly 90 and 92 is connected to the respective handle members 20 and 22 at each section 12 and 14. Each throttle assembly 90 and 92 has multiple features such as a thumb/finger lever, shown at 94 in FIGS. 2 and 3. Those skilled in the art will appreciate that the throttle assembly 90 and 92 can be a slide throttle, a lever throttle, a rotary throttle, a pressure throttle, without limiting the scope of the present invention.

Each throttle assembly 90 and 92 also features battery power levels (Full/Medium/Low), shown at 100, 102, 104 in FIG. 2 and 106, 108, and 110 in FIG. 3. It also provides a battery charging port 98, as shown in FIG. 2, and a speed control switch 97, also shown in FIG. 2. The speed control switch 97 limits the maximum speed at which the motorized walker 10 operates when the throttle is fully depressed. Each throttle assembly 90 and 92 is connected to the power pack through an electrical cable 112, however, this cable 112 can be replaced with fiber optic or RF control signals, without limiting the scope of the present invention.

Figure 6:
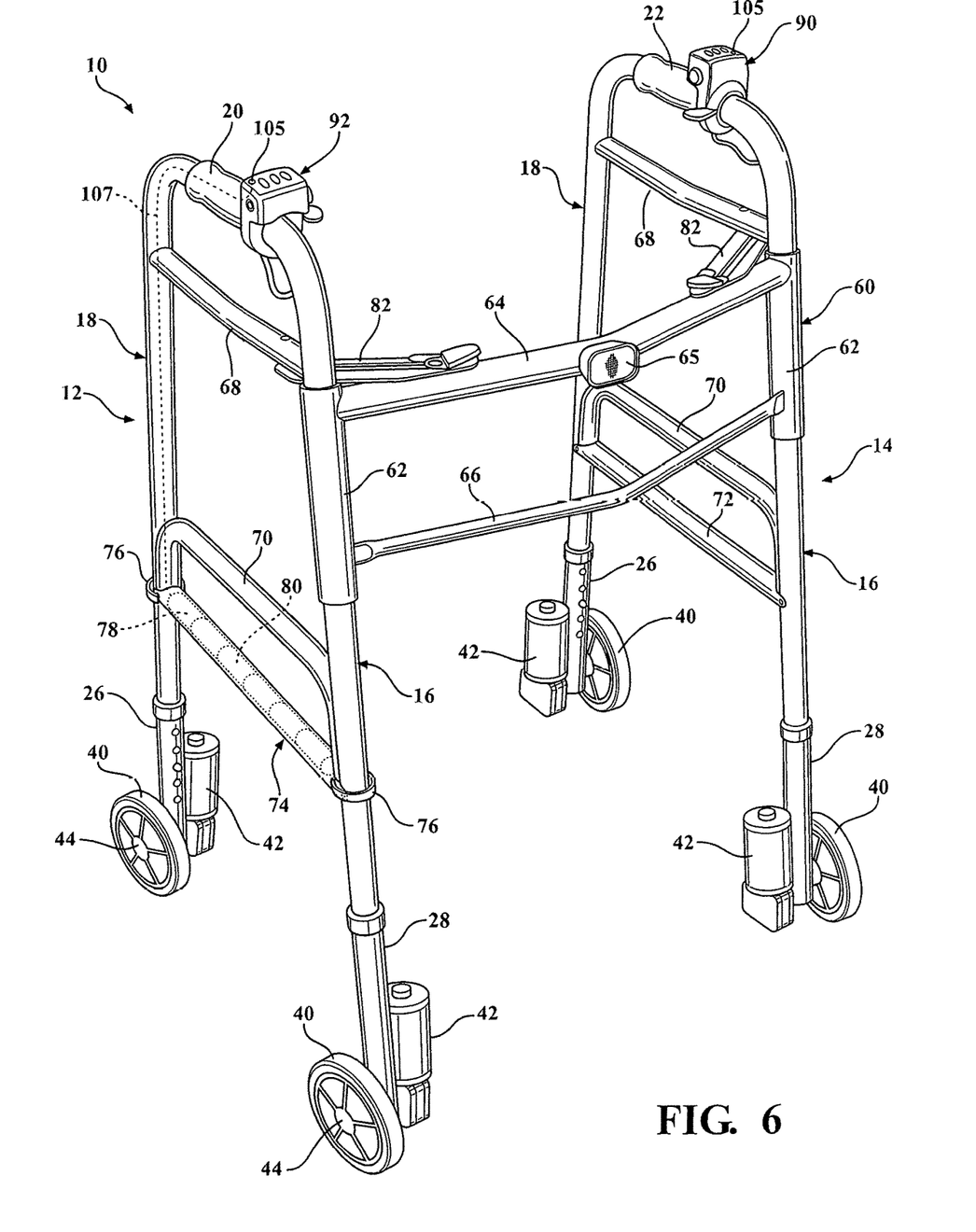
FIG. 6 illustrates a perspective view of another alternative embodiment of the motorized walking and balancing apparatus of the present invention as shown on FIG. 1 with multiple motors wherein each motor is connected to each of the four wheels thereby offering 4×4 wheel drive alternative to the users.

FIG. 6 illustrates another alternative embodiment of the walker 10. All elements of the walker 10 are identical to the walker as illustrated on FIG. 1 except the rear wheel. Here, as shown on FIG. 6, all wheels are identical to each other thereby providing unique motorized walking and balancing apparatus with each motor 42 connected to each of the four wheels 40 at each respective legs 16 and 18 thereby offering 4×4 wheel drive alternative to the user 30. In addition to the battery power levels (Full/Medium/Low), shown at 100, 102, 104 in FIG. 2 and 106, 108, and 110 of the throttle assembly 90 and 92 along with the battery charging port 98 and the speed control switch 97, each throttle assembly 90 and 92 includes an activating button 105, electrically 107 communicated with the controller 78. This particular embodiment enables users to take their grandchildren to the park with the ability to maneuver in the grass with similar ease as on the pathway. It also extends the walker to the benefit of users in the rural and farming areas. As the user 30 presses the activating button 105 at any of the throttle assembly 90 or 92, the walker 10 will switch to all wheel drive mode whereby all four motors 42 will function thereby rotating each wheel 40.

Alluding to the above, the controller 78 is cooperable with at least one throttle assembly 90 and 92 and each the motors 42 thereby allowing the user 30 to selectively operate the walking device 10 between a first mode as all of the wheels 40 are rotatable by each of the respective motors 42 in unison and a second mode as only two of the wheels 40 rotate. The controller 78 is cooperable with at least one throttle assembly 90 and 92 and each the motor 42 thereby allowing the user 30 to selectively operate the walking device 10 between a third mode as only the front wheels 40 rotate and a fourth mode as only rear wheels 40 rotate.

Figure 7A:
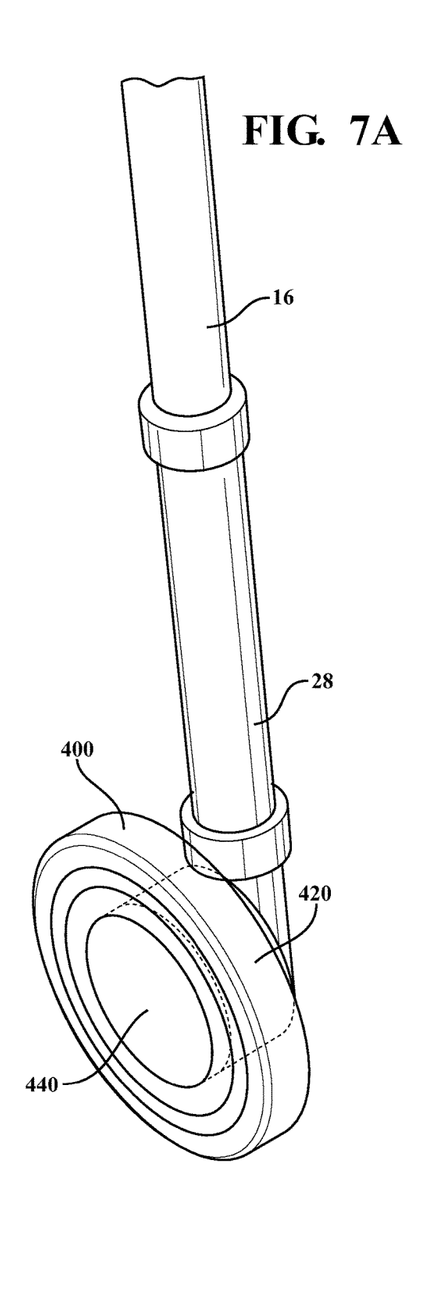
FIG. 7A illustrates a perspective fragmental view of one of the legs of the apparatus having a wheel and a motor cooperable with and located in the center of the wheel thereby forming a unitary component.
Figure 7B:
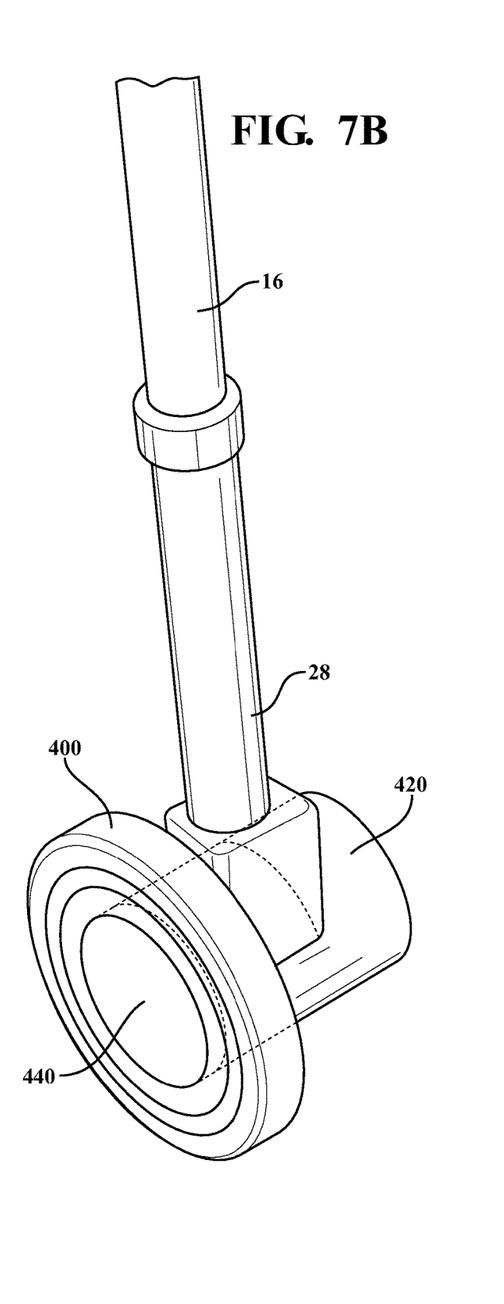
FIG. 7B illustrates a perspective fragmental view of an alternative embodiment of one of the legs of the apparatus having a wheel and a motor cooperable with and located in the center of the wheel thereby forming a unitary component.

FIGS. 7A and 7B illustrate additional alternative embodiments of the wheel assembly. FIG. 7A illustrates a perspective fragmental view of one of the legs 16 of the walker 10 having a wheel 400 and a motor 420 cooperable with and located in the center 440 of the wheel 400 thereby forming a unitary component and offering a more compact version of the walker 10.

FIG. 7B illustrates another perspective fragmental view of an alternative embodiment of wheel assembly, wherein the wheel 400 and the motor are cooperable with and are located in the center of the wheel thereby forming a unitary component. The different between embodiments shown in FIGS. 7A and 7B are motors of various capacities.

Figure 8:
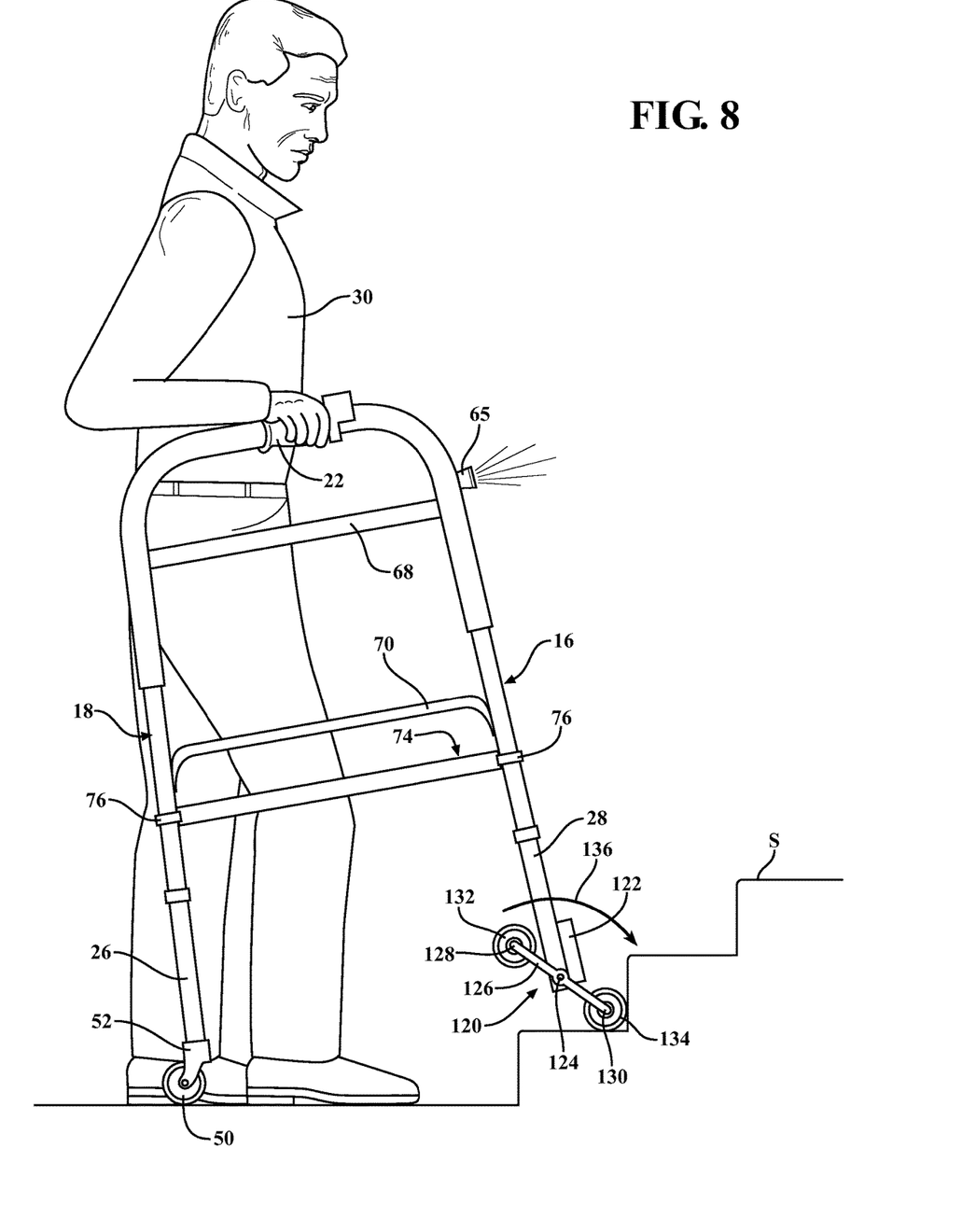
FIG. 8 illustrates a perspective view of another alternative embodiment of the motorized walking and balancing apparatus of the present invention as shown on FIG. 1 with a climbing device connected to front of the apparatus thereby allowing the user to safely climb the stairs with help of the walker.

FIG. 8 illustrates a perspective view of another alternative embodiment of the motorized walker 10 of the present invention as shown on FIG. 1. The walker 10 includes a climbing device, generally shown at 120. The climbing device 120 includes an activator 122 connected to the section 28 of each front leg 16 thereby allowing the user 30 to safely climb the stairs S with help of the walker 10. A pivoting axis 124 extends from the activator 122 and further receives a rotating bar 126 presenting terminal ends 128 and 130 to receive wheels 132 and 134. The climbing device 120 allows the rotating bar 126 to move forward 136 thereby assisting the user 30 safely climb the stairs S with help of the walker 10.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A walking device for aiding a user to improve movement of the user, said walking device comprising;
   a first section and a second section each including a pair of front and rear legs, said first section and said second section including a front wheel, a motor connected to each of said front leg and said rear leg of said first section and said second section, wherein each rear leg and front leg includes respective extension elements telescopingly engaged with the terminal ends of the respective rear legs and said front legs to allow the user to adjust the height of said walking device, said elements including a plurality of openings to receive a pin extending from said rear legs and said front legs to mechanically secure said elements with said rear legs and said front legs;
   a power source to supply power to each of said motors;
   at least one throttle assembly connected to at least one of said first section and said second section; and
   a controller cooperable with said at least one throttle assembly and each said motors thereby allowing the user to selectively operate said walking device between a first mode as all of said wheels are rotatable by each of said respective motors in unison and a second mode as only two of said wheels rotate.

2. The system as set forth in claim 1, wherein said controller cooperable with said at least one throttle assembly and each said motor thereby allowing the user to selectively operate said walking device between a third mode as only front wheels rotate and a fourth mode as only rear wheels rotate.

3. The system as set forth in claim 1, wherein said first section and said second section are interconnected by a middle section presenting side tubes, with said front legs extending therethrough, and rigidly interconnected by a top reinforcement bar.

4. The system as set forth in claim 3, wherein said top reinforcement bar includes a light device and a bottom reinforcement bar.

5. The system as set forth in claim 3, wherein each said first section and said second section includes a side reinforcement element pivotably connected to said top reinforcement bar by a fold release mechanism to allow the user to fold said walking device in order to store and or transport said walking device.

6. The system as set forth in claim 1, wherein one of said first section and said second section includes a bottom reinforcement bar interconnecting said rear leg and said front leg to store said controller and batteries and a clip to rigidly secure said bottom reinforcement bar to said front leg and said rear leg and release therefrom when said controller needs to be serviced.

7. The system as set forth in claim 6, wherein said throttle assembly has multiple features including at least one of a thumb/finger lever, an activating button, communicated with said controller.

8. The system as set forth in claim 6, wherein each said wheel and said motor are cooperable with and located in the center of said wheel thereby forming a unitary component.

* * * * *